Dec. 20, 1955     R. LE B. BOWEN, JR     2,727,398
VARIABLE SPEED TRANSMISSION
Filed Jan. 18, 1954

*INVENTOR.*
RICHARD Le B. BOWEN, Jr.
BY
*William Frederick Werner*
ATTORNEY

United States Patent Office 2,727,398
Patented Dec. 20, 1955

2,727,398

VARIABLE SPEED TRANSMISSION

Richard Le B. Bowen, Jr., Pawtucket, R. I.

Application January 18, 1954, Serial No. 404,708

5 Claims. (Cl. 74—230.17)

This invention relates to a variable speed transmission and more particularly to a transmission wherein a mechanism controls the belts which engage pulleys of the type in which the effective or pitch diameters vary.

An object of the present invention is to provide a variable speed transmission by means of which the speeds within the limits of the maximum and minimum can be varied an amount greater than heretofore.

Another object of the present invention is to provide a variable speed transmission which eliminates certain of the driving connections heretofore employed in transmissions of this nature.

And still another object of the present invention is to provide an extremely compact, simple in construction and highly convenient to adjust variable speed transmission.

Other objects of the present invention will be pointed out in part and become apparent in part in the following specification and claims.

In the past variable speed transmissions, to obtain a practical range of greater than a three to one speed ratio between the input and output shafts, have employed elaborate thrust bearings, complicated shifting mechanisms to vary the speed ratio, separate stands for mounting the thrust bearings and special enclosed housings. This invention eliminates these costly and complicated construction features while at the same time increasing the speed ratio between the input and output shaft.

Like reference characters refer to like parts in the accompanying drawing wherein.

Figure 1:
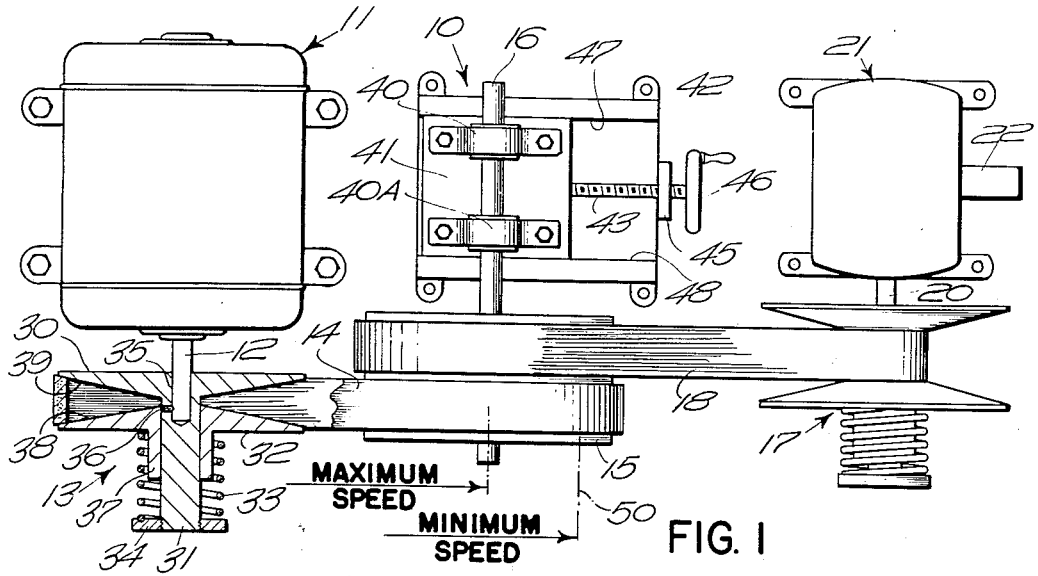
Figure 1 is a plan view of the new and improved variable speed transmission.
Figure 2:
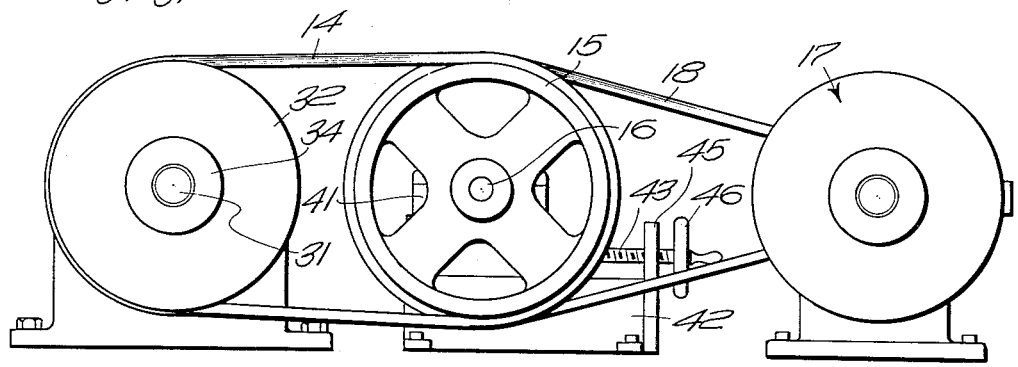
Figure 2 is a front elevational view of Figure 1.
Figure 3:
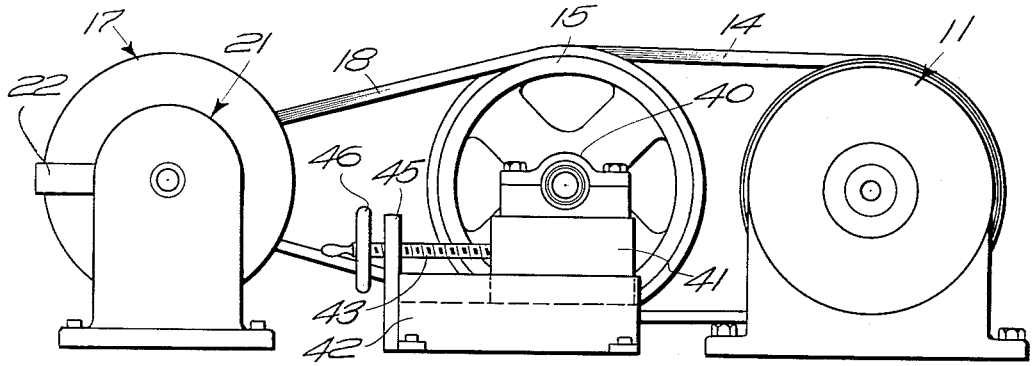
Figure 3 is a rear elevational view of Figure 1.

Referring to the drawings, reference character 11 generally indicates an electric motor provided with an output shaft 12. A resiliently expansible V-pulley generally indicated by reference character 13 comprises an inside disk 30 having an extended hub 31 and a bore 35 with a set screw 36 securing hub 31 to output shaft 12. An outer disk 32 provided with a sleeve 37 which is slidably mounted on hub 31 has an angular face 38 which co-operates with an angular face 39 on the inside of disk 30 to form the V when said disks co-act as a pulley. A stop collar 34 is secured to the outer end of hub 31. A spring 33 is interposed between stop collar 34 and outer disk 32 to cause said outer disk to yieldingly urge angular face 38 toward angular face 39.

A gear reducer generally indicated at 21 is provided with an input shaft 20 and an ultimate work shaft 22. A resiliently expansible V-pulley generally indicated at 17 is identical in construction with resiliently expansible V-pulley 13 and is secured to input shaft 20 in the identical manner that V-pulley 13 is secured to output shaft 12.

A speed control unit generally indicated at 10 comprises a base 42 having ways 47, 48 and a lug 45 fixed to said base. A bed 41 having bearings 40, 40A is slidably mounted in ways 47, 48. A shaft 16 is rotatively mounted in bearings 40, 40A. A screw 43 has one end fixed for idle rotation in bed 41 and for rotational engagement with threads in lug 45. A handwheel 46 is secured to the other end of screw 43. A flat faced pulley 15 is secured to shaft 16. An edge-active V-belt 14 operatively engages angular faces 38 and 39 of V-pulley 13 with pulley 15. Another edge-active V-belt 18 operatively engages V-pulley 17 with pulley 15.

The figures of the drawing show the variable speed transmission in maximum speed position. The dot and dash line 50 shows the position of shaft 16 when the variable speed transmission is in minimum speed position. Assume that both resiliently expansible V-pulleys 13 and 17 have speed ratios of three to one. Assume further that shaft 16 is turning at the same speed as output shaft 12. Then input shaft 20 is driven at three times the speed of output shaft 12. To change the speed ratio between output shaft 12 and input shaft 20, handwheel 46 is manually revolved causing bed 41 to slide in ways 47, 48 thereby moving shaft 16 toward dot and dash line 50. In so doing, edge-active belt 14 will be forced toward the center of resiliently expansible V-pulley 13, separating angular face 39 away from angular face 38 against the tension of spring 33 as flat faced pulley 15 carries edge-active belt 14 in the direction of movement of shaft 16. Conversely, resiliently expansible V-pulley 17 will increase its pitch diameter as edge-active belt 18 under the influence of the movement of flat face pulley 15 permits the spring to force inside disk and outside disk toward each other. Thus, with a change of the pitch diameters of resiliently expansible V-pulleys 13 and 17, the speed ratio between input shaft 12 and output shaft 20 is effected.

When shaft 16 assumes minimum speed position 50, edge-active belt 14 is in minimum pitch diameter in resiliently expansible V-pulley 13. Shaft 16 then travels at one third the speed of output shaft 12. Resiliently expansible V-pulley 17 is now at maximum pitch diameter and so effects the speed of edge-active belt 18 through flat face pulley 15 and shaft 16 to cause input shaft 20 to travel at the same speed as shaft 16 or one third the speed of output shaft 12. Therefore a speed change in the ratio of nine to one is accomplished between output shaft 12 and input shaft 20.

Having shown and described a preferred embodiment of the present invention, by way of example, but realizing that structural changes could be made and other examples given without departing from either the spirit or scope of this invention.

What I claim is:

1. A variable speed transmission comprising an output shaft, a resiliently expansible V-pulley fixed to said output shaft, an input shaft, a second resiliently expansible V-pulley fixed to said input shaft, a speed control device including a rotatable shaft and means for changing the relative position of said rotatable shaft within said speed control device, a flat face pulley fixed to said rotatable shaft, an edge-active V-belt connecting said first mentioned resiliently expansible V-pulley with said flat face pulley, a second edge-active V-belt connecting said flat face pulley with said second mentioned resiliently expansible V-pulley, said speed control device including said flat face pulley effecting simultaneously and opposite changes of the pitch diameters of both of said resiliently expansible V-pulleys.

2. A variable speed transmission comprising an output shaft, a resiliently expansible V-pulley fixed to said output shaft, an input shaft, a second resiliently expansible V-pulley fixed to said input shaft, a speed control device including a slidably mounted rotatable shaft, means for slidably moving said rotatable shaft, a flat face pulley fixed to said rotatable shaft, an edge-active V-belt connecting said first mentioned resiliently expansible V-pulley with said flat face pulley, a second edge-active V-belt connecting said flat face pulley with said second mentioned resiliently expansible V-pulley, said speed control device including said flat face pulley effecting simultaneous and opposite changes of the pitch diameters of both said resiliently expansible V-pulleys.

3. A variable speed transmission comprising an output shaft, a resiliently expansible V-pulley fixed to said output shaft, an input shaft, a second resiliently expansible V-pulley fixed to said input shaft, a speed control device including a slidably mounted rotatable shaft, means for shifting said rotatable shaft toward and away from said output shaft and said input shaft simultaneously and oppositely, a flat face pulley fixed to said rotatable shaft, an edge-active V-belt connecting said first mentioned resiliently expansible V-pulley with said flat face pulley, a second edge-active V-belt connecting said flat face pulley with said second mentioned resiliently expansible V-pulley, said speed control device including said flat face pulley effecting simultaneous and opposite changes of the pitch diameters of both said resiliently expansible V-pulleys.

4. A variable speed transmission comprising an electric motor having an output shaft, a resiliently expansible V-pulley consisting of two coned disks with means for yieldingly urging the two coned disks toward each other, one of said coned disks being fixed to said output shaft, a gear reducer having an input shaft, a second resiliently expansible V-pulley consisting of two coned disks with means for yieldingly urging the two coned disks toward each other, one of said coned disks being fixed to said input shaft, a speed control device including a slidably mounted rotatable shaft, means for shifting said rotatable shaft toward and away from said output shaft and said input shaft simultaneously and oppositely, a flat face pulley fixed to said rotatable shaft, an edge-active V-belt connecting said first mentioned resiliently expansible V-pulley with said flat face pulley, a second edge-active V-belt connecting said flat face pulley with said second mentioned resiliently expansible V-pulley, said speed control device including said flat face pulley effecting simultaneous and opposite changing of the relation of said first mentioned coned disks toward each other and said second mentioned coned disks toward each other through said first mentioned edge-active belt and said second mentioned edge-active belt.

5. A variable speed transmission comprising an electric motor having an output shaft, a resiliently expansible V-pulley consisting of two coned disks with means for yieldingly urging the two coned disks toward each other, said expansible V-pulley being fixed to said output shaft, a gear reducer having an input shaft, a second resiliently expansible V-pulley consisting of two coned disks with means for yieldingly urging the two coned disks toward each other, said second expansible V-pulley being fixed to said input shaft, a speed control device including a slidably mounted rotatable shaft, means for shifting said rotatable shaft toward and away from said output shaft and said input shaft simultaneously and oppositely, a flat face pulley fixed to said rotatable shaft, an edge-active V-belt connecting said first mentioned resiliently expansible V-pulley with said flat face pulley, a second edge-active V-belt connecting said flat face pulley with said second mentioned resiliently expansible V-pulley, said speed control device including said flat face pulley effecting simultaneous and opposite changing of the relation of said first mentioned coned disks toward each other and said second mentioned coned disks toward each other through said first mentioned edge-active belt and said second mentioned edge active belt.

References Cited in the file of this patent

UNITED STATES PATENTS

| | | |
|---|---|---|
| 1,822,935 | Reeves | Sept. 15, 1931 |
| 2,223,051 | Thompson | Nov. 26, 1940 |
| 2,251,488 | Hucke | Aug. 5, 1941 |

FOREIGN PATENTS

| | | |
|---|---|---|
| 103,302 | Sweden | Dec. 12, 1941 |